No. 632,112. Patented Aug. 29, 1899.
W. H. HARDEN.
ANIMAL TRAP.
(Application filed Feb. 24, 1899.)
(No Model.) 3 Sheets—Sheet 1.
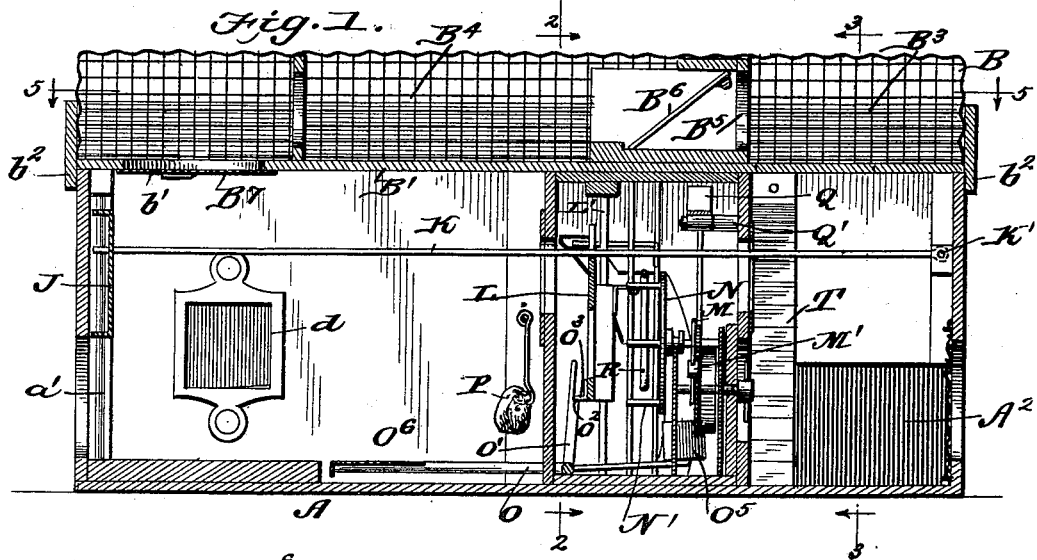
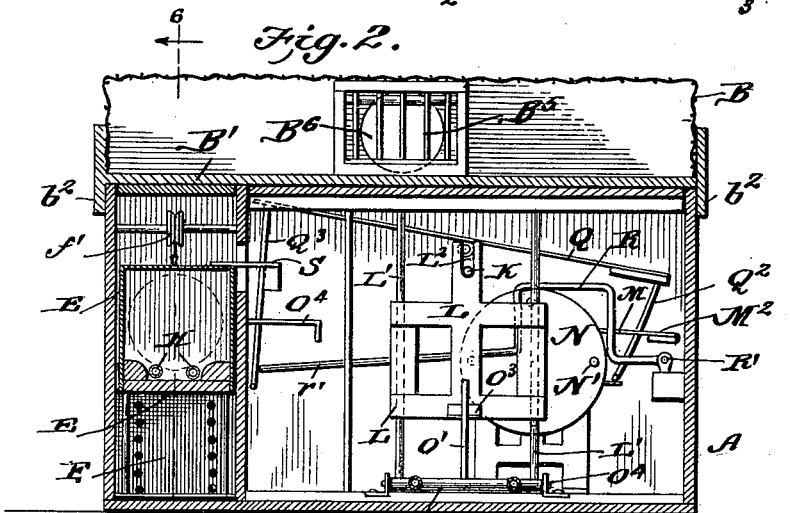
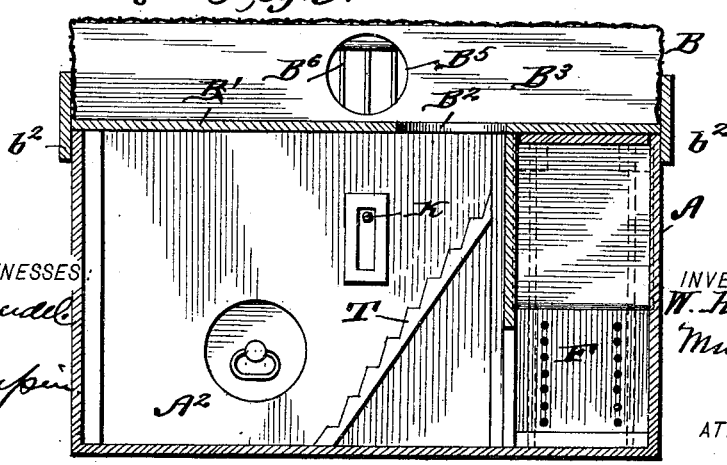
WITNESSES:
M. B. Blondel
P. B. Turpin
INVENTOR
W. H. Harden
by
Munn & Co.
ATTORNEYS.

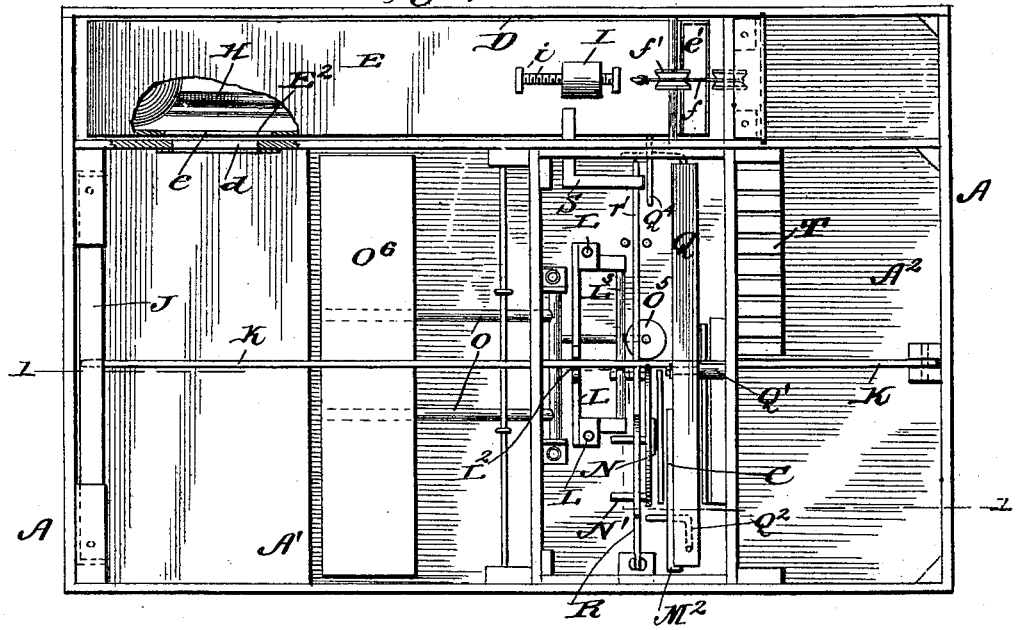
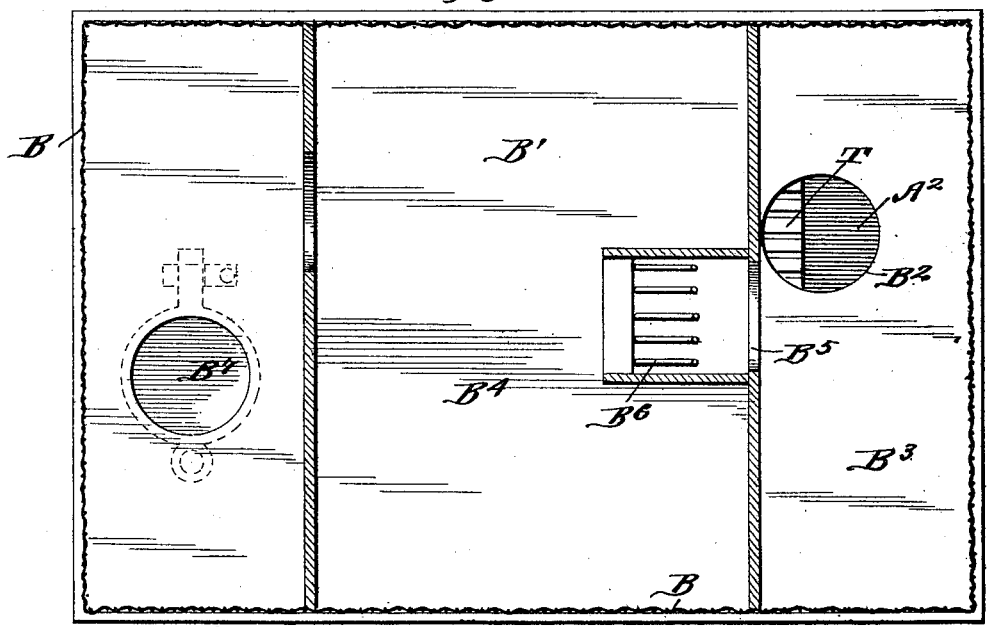

No. 632,112. Patented Aug. 29, 1899.
W. H. HARDEN.
ANIMAL TRAP.
(Application filed Feb. 24, 1899.)

(No Model.) 3 Sheets—Sheet 3.

WITNESSES:
INVENTOR
W. H. Harden.
BY
ATTORNEYS.

THE NORRIS PETERS CO., PHOTO-LITHO., WASHINGTON, D. C.

UNITED STATES PATENT OFFICE.

WILLIAM H. HARDEN, OF QUITMAN, GEORGIA.

ANIMAL-TRAP.

SPECIFICATION forming part of Letters Patent No. 632,112, dated August 29, 1899.

Application filed February 24, 1899. Serial No. 706,664. (No model.)

*To all whom it may concern:*

Be it known that I, WILLIAM H. HARDEN, of Quitman, in the county of Brooks and State of Georgia, have invented a new and useful Improvement in Animal-Traps, of which the following is a specification.

My invention is an improvement in animal-traps, and particularly in that class of such traps known as "self-setting" and "resetting;" and the invention consists in certain novel constructions and combinations of parts, as will be hereinafter described, and pointed out in the claims.

Figure 6:
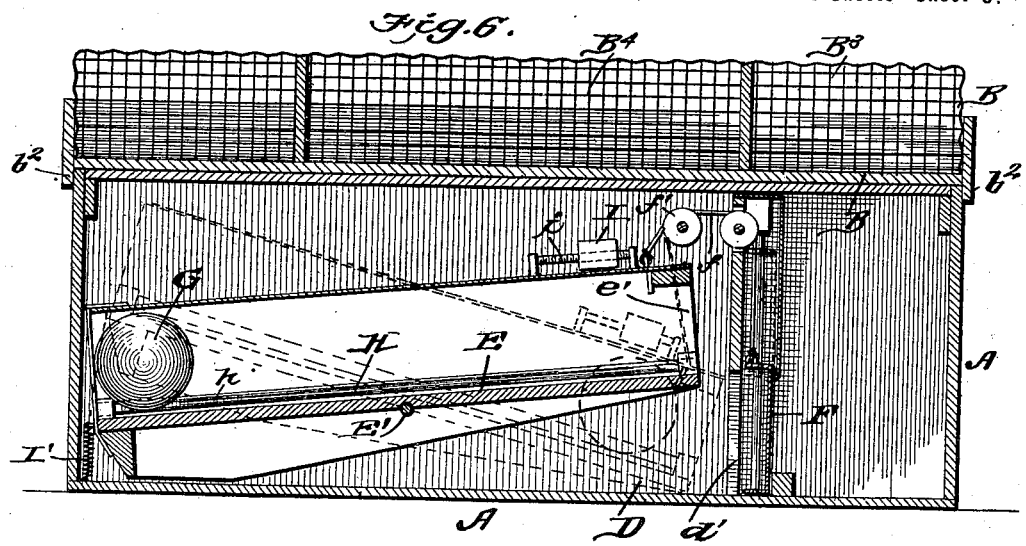
Figure 7:
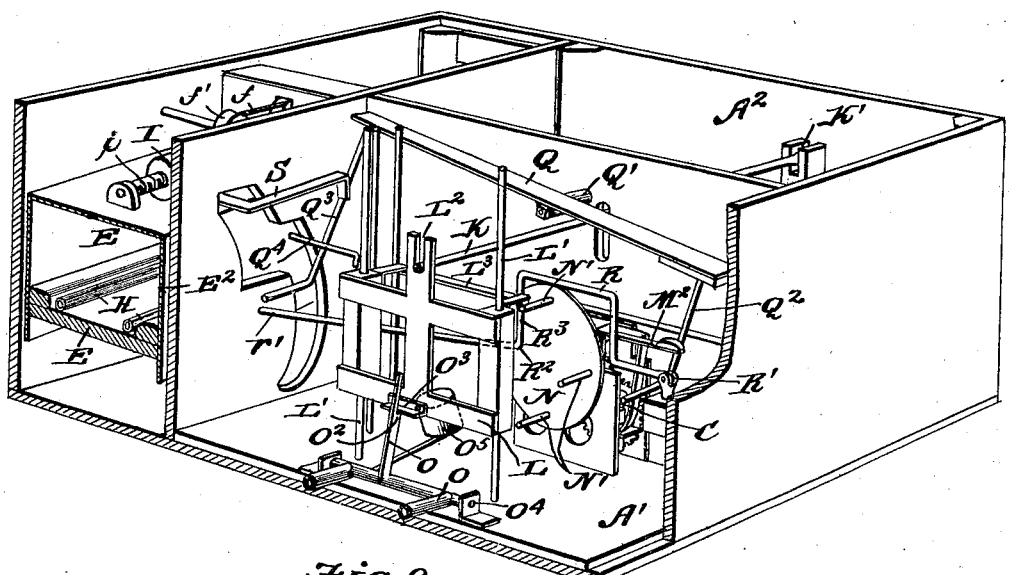
Figure 8:
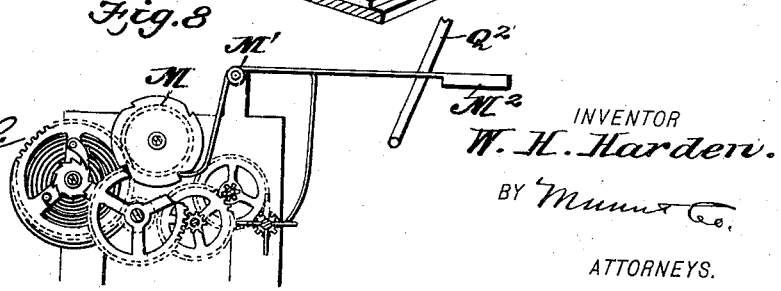

In the drawings, Figure 1 is a vertical longitudinal section of my trap on about line 1 1 of Fig. 4. Fig. 2 is a cross-section on about line 2 2 of Fig. 1. Fig. 3 is a cross-section on about line 3 3 of figure 1. Fig. 4 is a top-plan view of the lower section of the trap. Fig. 5 is a horizontal section on about line 5 5 of Fig. 1. Fig. 6 is a vertical longitudinal section on about line 6 6 of Fig. 2. Fig. 7 is a perspective view, parts being broken away, of the trap; and Fig. 8 is a detail view of the clock mechanism, parts being removed and others shown in section.

The trap is formed with a lower or main section A and an upper or cage section B, fitted removably on the lower section, so it can be removed therefrom for the purpose of disposing of the trapped animals. The upper section B has a base B' and inlet $B^2$, through which the animal passes from the trapping-section into the cage, and the latter is divided into inlet and discharge compartments $B^3$ and $B^4$, having a communicating opening $B^5$, guarded by needles $B^6$, which permit the animals to pass from the compartment $B^3$ to the compartment $B^4$ and yet prevent the animal from passing back from compartment $B^4$ into compartment $B^3$. The base B' has a discharge-opening b', leading from the compartment $B^4$, which is guarded by the door $B^7$. When the animals have been trapped and passed into the cage, as presently described, the section B may be removed from the section A and the door $B^7$ be opened to discharge the animals. The section B has at its lower edges depending flanges $b^2$, which fit over the upper end of the section A, securing the section B in place and yet permitting the same to be conveniently removed when desired.

The trapping-section A is divided into an entrance-chamber A' and a second chamber $A^2$ by an intermediate partition, which is in the form of a hollow partition and receives the clock mechanism C, which operates to reset the trap, as will be presently described. A passage-way D leads from the chamber A' to the chamber $A^2$ for the passage of the trapped animal into the chamber A. An opening d leads from the chamber A' into the passage D, and an opening d' leads from said passage into the chamber $A^2$. A tilting platform or chute E operates in the passage D and is pivoted at E' about midway between its ends. This platform has a side plate $E^2$, which operates close to the opening d, and in such plate $E^2$, I form an opening e, which registers with the opening d when the platform is in the full-line position shown in Fig. 6. At its end e' the platform is open and registers with the opening d' when the platform is in the dotted position shown in Fig. 6. The gate F guards the opening d' and closes the same when the platform is in the full-line position shown in Fig. 6. This gate F is connected by cord f, passed over pulley f', with the platform E, so such platform, when tilted to the dotted-line position, Fig. 6, will open the gate F, as indicated in said figure. A ball G rolls back and forth on the platform D. It is preferred to provide a track for such ball and to make such track of glass tubes H, which contain a quantity of mercury h, that can pass from end to end of the tubes when tilted and so serve to counterbalance the platform. The platform is also provided with a counterbalance-weight I, threaded on a rod i, so it can be adjusted, and beneath the front end of the platform I provide a spring I', which relieves the shock of the platform in assuming the position shown in full lines, Fig. 6, and aids the weight of the animal in adjusting the platform to the dotted-line position shown in said Fig. 6.

The chamber A' has an inlet-opening a', which is guarded by the door J, which moves down over or up clear of the opening a'. The door is up in full lines in Fig. 1 and may be lowered to prevent the egress of the animal. The door J is carried on one end of a long rod K, which is pivoted at its other end at K', so its free end may rise and fall to open and close the door. Between its ends the rod K rests upon a vertically-movable support L, consisting of a frame sliding on guides L' and having a slot L², in which the rod K rests. A rod or other bearing L³ is arranged at the rear side of the frame L for engagement by the clock mechanism C. This clock mechanism may be in general respects in the form of a common clock-train and provided with an escapement or ratchet wheel M and with a wheel N, having projecting pins N', which engage beneath the rod or portion L³ of the frame L and lift the said frame and the door to open the latter. When the door-holding frame is raised by the wheel N to the position shown in Fig. 7, it is held by a latch O' on a trigger O, such latch having a shoulder O², engaging beneath a suitable plate O³ on the frame L. The trigger is a lever pivoted at O⁴, having a counterbalance-weight O⁵ on its rear arm and its front arm provided with a treadle O⁶, on which the animal's weight when it approaches the bait P will operate to release the latch O' from the door-holder and let the latter fall and the door close. It will be understood that after lifting the door-holder the pin N' passes out of engagement with such holder just as or shortly after the latch O' passes into engagement with the plate O³, so the door-holder is free to fall and lower the door J when the latch O' is released.

The escapement or ratchet wheel M is engaged by one end of a lever M', whose other end is weighted at M² and is arranged at such end for operation by a lever Q, which is pivoted at Q', has at one end a link Q² to engage beneath the end M² of the lever M', and bears at its other end a link Q³, which is engaged by a projection Q⁴ at the rear end of the tilting platform. The projection Q⁴ is so arranged that it engages the link Q³ when the rear end of the platform is near its lowest point and so rocks the lever Q and releases the detent M' at such time, so the clock mechanism will be freed to readjust the door-holder to position to open the door. The clock mechanism also operates to adjust the platform from the dotted to the full line position shown in Fig. 6. To this end I provide a swinging arm R, pivoted at one end at R', having its other end r' arranged to engage beneath a lateral projection S at the rear end of the platform E and provided between its ends with a portion R², arranged for engagement by the pins N'. This portion R² has an upright portion or bend R³, just in rear of its portion R², so the end r' will drop just after the arm R has been operated to lift the rear end of the platform E, so the ball G will roll to the front end thereof and hold the platform in the full-line position shown in Fig. 6.

In the operation of the trap, when it is set with the door open, as shown in Fig. 1, the several parts are in the positions they occupy in said figure and in Figs. 2, 6, 7, and 8. If now the animal enters the compartment A' through door a' and approaches the bait P, it will by its weight on treadle O⁶ release latch O' from the door-holder L, and it will fall with the door J. The latter closing the opening a' leaves but one escape for the animal from compartment A'—that is, through the exit-opening d into the passage D and onto the platform E, which is in the position shown in full lines, Fig. 6. The animal passing rearwardly up the platform E will, after it passes the pivot E', tilt the platform E to the position indicated in dotted lines, Fig. 6, and the ball will roll down platform E, forcing the trapped animal through opening d', whose gate F has been raised by the lowering of the rear end of the platform, as before described. The animal now passes into the compartment A², from which it passes up the steps T into the cage-section, in which it passes under the needle B' into the compartment B⁴, from which it can be removed by opening the gate B⁷ when the cage-section has been removed from the trap-section, as before described. As the rear end of the platform moves down it will by its projection Q⁴ operate the lever Q to release the detent M' from the ratchet M, permitting the clock mechanism to operate to lift the door-holder L, which will open the door. The wheel N also lifts the arm R and so readjusts the tilting platform from the position indicated in dotted lines to that shown in full lines, Fig. 6, the ball G rolling back to the full-line position shown in Fig. 6. The trap is thus reset. When the platform is in the dotted position shown in Fig. 6, the ball G closes the opening d', and such opening will be closed in the full-line position of the parts in said figure by the gate F.

The operation of the clock mechanism is step by step, the pins N' operating successively one after the other, so that a single winding of the clock mechanism will effect a great many operations of the tripping devices.

Having thus described my invention, what I claim as new, and desire to secure by Letters Patent, is—

1. An animal-trap comprising the box or case, a tilting platform forming a passage for the animal, and a ball rolling on said platform substantially as set forth.

2. An improved animal-trap comprising the box or case, a tilting platform forming a passage for the animal, a chamber with which such platform communicates, a door controlling such communication, a connection between the door and platform whereby the movements of the latter may control the position of the door, a counterbalance-weight adjustable upon said platform, and a ball rolling on the platform substantially as set forth.

3. In an animal-trap, a tilting platform forming a passage for the animal from one compartment to another and having a ball rolling within it and forming a closure for the exit-opening of said platform and a means for driving the animal out of said exit substantially as set forth.

4. A self-setting trap having an entrance-compartment, a second compartment, a passage connecting the two compartments, a tilting platform in said passage, a gate controlling the opening of said passage into the second compartment, the platform tilting into and out of register with the gateway of said gate and connections between said gate and the tilting platform whereby the platform as it moves into register with the gateway may open the gate substantially as set forth.

5. A self-setting trap comprising a cage having two compartments and a passage between the same, a tilting platform in said passage, a door for the front compartment, a vertically-movable frame for opening said door, a clock mechanism provided with a wheel having pins to engage and raise the door-opening frame, an escapement-lever in connection with the clock mechanism, intermediate devices between the said lever and the tilting platform and a trigger having a catch to engage the door-holding frame and hold such frame raised substantially as set forth.

6. In an animal-trap, the combination of the entrance-chamber having an exit-opening, the passage-way having a tilting platform movable past said exit-opening, and a ball rolling on said platform and adapted to operate substantially as set forth.

7. In an animal-trap the combination of the box or case having an inlet-opening, a door controlling the said opening, an arm supporting said door, a vertically-movable frame engaging said arm whereby to open the door, clockwork mechanism whereby to lift said frame, a trigger having a latch portion for holding said frame elevated, and devices arranged for operation by the trapped animal by which to release the clock mechanism to operate substantially as described.

8. In an animal-trap a platform or chute provided with a rolling ball and with a track therefor composed of glass tubes and mercury movable therein substantially as set forth.

9. An animal-trap substantially as described provided with a tilting platform for the passage of the animal and with a ball rolling thereon and arranged to be tilted in one direction by the weight of the animal, combined with means for tilting the platform in the opposite direction substantially as set forth.

10. In an animal-trap the combination with the tilting platform and the clock mechanism, of means whereby the movement of the platform may release the clock mechanism and devices whereby the clock mechanism will readjust the tilting platform substantially as set forth.

11. In an animal-trap the combination of the door, the door-holder, the clock mechanism having means for lifting the door-holder, and the trigger having a latch by which to hold the door-holder when raised substantially as set forth.

12. The combination of the tilting platform, the clock mechanism having a wheel provided with projecting pins, and the arm provided with a portion for engagement by the pins and with a vertical bend or dropped portion adjacent to said first portion, said arm being pivoted at one end and arranged at its movable end for engagement with the tilting platform whereby to lift the latter substantially as set forth.

13. The combination with the tilting platform and the clock mechanism having an escapement or detent lever, of the lever pivoted between its ends and arranged at one end to release the detent-lever and at its other end for operation by the tilting platform substantially as set forth.

14. The combination of the clock mechanism having a detent or escapement lever and a wheel provided with pins, the tilting platform, the door-holding frame arranged for operation by the pins of said wheel, the latch for said door-holder, the lever arranged for operation by the platform and provided with means for releasing the detent-lever, and the arm for readjusting the tilting platform arranged for operation with the pins of the pin-wheel all substantially as set forth.

WILLIAM H. HARDEN.

Witnesses:
F. L. JONES,
GEORGE D. RAYSON.